US011243161B1

(12) United States Patent
Lien et al.

(10) Patent No.: US 11,243,161 B1
(45) Date of Patent: Feb. 8, 2022

(54) GAS MEASUREMENT DEVICE AND GAS MEASUREMENT METHOD

(71) Applicant: INDUSTRIAL TECHNOLOGY RESEARCH INSTITUTE, Hsinchu (TW)

(72) Inventors: Chin Lien, Hsinchu (TW); Cho-Fan Hsieh, Hsinchu (TW); Chia-Jen Lin, Hsinchu (TW); Yu-Tai Li, Hsinchu (TW); Wei-You Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/953,493

(22) Filed: Nov. 20, 2020

(51) Int. Cl.
*G01N 21/3504* (2014.01)
*G01N 21/3581* (2014.01)

(52) U.S. Cl.
CPC ..... *G01N 21/3504* (2013.01); *G01N 21/3581* (2013.01)

(58) Field of Classification Search
CPC .................. G01N 21/3504; G01N 21/3581
See application file for complete search history.

(56) References Cited

U.S. PATENT DOCUMENTS

| 6,787,776 | B2 | 9/2004 | Webber et al. |
|---|---|---|---|
| 7,352,463 | B2 | 4/2008 | Bounaix |
| 8,748,822 | B1 | 6/2014 | Gerecht et al. |
| 2005/0056785 | A1 | 3/2005 | Chou et al. |
| 2008/0014580 | A1 | 1/2008 | Alfano et al. |
| 2013/0087709 | A1 | 4/2013 | Mendoza et al. |
| 2016/0216201 | A1* | 7/2016 | Iwaszczuk ............... G01J 3/28 |
| 2018/0252624 | A1 | 9/2018 | Oka |
| 2020/0041409 | A1 | 2/2020 | Falk et al. |

FOREIGN PATENT DOCUMENTS

| CN | 102590092 | 7/2012 |
|---|---|---|
| CN | 103776796 | 5/2014 |
| CN | 108776117 | 11/2018 |
| CN | 109037962 | 12/2018 |
| CN | 109283154 | 1/2019 |
| CN | 110621980 | 12/2019 |
| EP | 3040706 | 7/2016 |
| TW | 201418696 | 5/2014 |

OTHER PUBLICATIONS

You, et al. "Sensitivity analysis of multilayer microporous polymer structures for terahertz volatile gas sensing", Optics Express; Mar. 6, 2017; Optics Express 5651, vol. 25, No. 5.

(Continued)

*Primary Examiner* — David P Porta
*Assistant Examiner* — Meenakshi S Sahu
(74) *Attorney, Agent, or Firm* — Amin, Turocy & Watson, LLP

(57) ABSTRACT

A gas measurement device is provided and includes a gas channel module and a sensor component disposed within the gas channel module. The sensor component includes a substrate, a porous membrane, and a metal layer disposed between the substrate and the porous membrane. A gas measurement method is also provided.

19 Claims, 9 Drawing Sheets

(56) References Cited

OTHER PUBLICATIONS

You, et al. "Terahertz volatile gas sensing by using polymer microporous membranes", Optics Express; Feb. 9, 2015; Optics Express 2048, vol. 23, No. 3.
Taiwanese Office Action for Taiwanese Patent Application No. 110104750 dated Oct. 29, 2021.
Kakimi, et al. "Capture of a terahertz wave in a photonic-crystal slab," Nat. Photonics vol. 8, pp. 657-663, Jul. 20, 2014. https:/doi.org/10.1038/nphoton 2014.150, spec. pp. 660, 662 and drawings 1a, 3, 5c, S19.

* cited by examiner

GAS MEASUREMENT DEVICE AND GAS MEASUREMENT METHOD

TECHNICAL FIELD

The present disclosure relates to a gas measurement technique, and more particularly, to a gas measurement device and a gas measurement method.

BACKGROUND

Electromagnetic waves in the terahertz range offers numerous advantages for qualitative and quantitative detections of materials. For example, terahertz waves can be used for contactless measurements and can also facilitate the collection of real-time signals. The wide frequency band of the terahertz wave encompasses a vast amount of gas absorption characteristics. Furthermore, when terahertz photons interact with gas molecules, they are absorbed by the molecules and the vibrational and rotational energy states of the molecules themselves are altered. For example, only pure rotational spectra remain for the characteristic absorptions of many polar gas molecules in the terahertz range.

Although the terahertz absorption spectrum of gas has a high distribution density, but under the Doppler limit or low gas pressure conditions, there is almost no overlapping of the absorption lines. In a narrow frequency range, the terahertz absorption spectrum of gas still demonstrates the ability to identify materials. As a result, the application of terahertz spectrum is useful in identifying complex gas types. However, in view of the intensity of the terahertz waves that can be generated by today's technology levels, the interaction intensities of the terahertz waves with a gas have to be increased when performing gas measurement.

In order to increase the terahertz spectrum signals, one common approach is to adopt the design of a longer optical path, so as to amplify the signal response of a gas to terahertz wave. More specifically, this approach often uses a multi-pass gas cell to provide a sufficiently long optical path for the terahertz waves to travel. However, a drawback of this approach is that the terahertz measurement structure is often bulky and not portable.

In addition, another common approach is to use a semiconductor chip made of metamaterial. However, one disadvantage of this approach is that only a narrow band of resonance signals can be obtained, and broadband fingerprint scan of the molecules is not viable, thereby limiting its selectivity.

Moreover, another conventional approach involves the use of photonic crystals for gas measurement. However, a shortcoming of this approach is that the entire measurement process occurs in the photonic crystal. As a result, the short acting length limits the sensitivity and selectivity for gas measurement.

Therefore, there is a need for a terahertz measurement approach that enhances the interaction intensities of the material to be tested with the terahertz waves or provides good measurement device portability, sensitivity and selectivity.

SUMMARY

The present disclosure provides a gas measurement device and a gas measurement method, which, for example, enhances the interaction intensities of the material to be tested with the terahertz waves, or provides good measurement device portability, excellent sensitivity and superior selectivity.

The gas measurement device of the present disclosure includes a gas channel module and a sensor component, wherein the sensor component is disposed within the gas channel module. The sensor component includes a substrate, a metal layer, and a porous membrane, and the metal layer is disposed between the substrate and the porous membrane.

The gas measurement method of the present disclosure includes: providing a gas measurement device and a terahertz wave system; guiding a gas to be tested into the gas measurement device; using the terahertz wave system to generate a first terahertz wave having a first information to enter into the gas measurement device; using the terahertz wave system to receive a second terahertz wave having a second information leaving the gas measurement device; and analyzing the first information and the second information to obtain characteristic information of the gas to be tested, wherein the gas measurement device includes a gas channel module and a sensor component, wherein the sensor component is disposed within the gas channel module, and the sensor component includes a substrate, a porous membrane, and a metal layer disposed between the substrate and the porous membrane.

DETAILED DESCRIPTION

The ways in which the present disclosure can be implemented are illustrated in the following embodiments. One of ordinary skill in the art can readily appreciate other advantages and technical effects of the present disclosure based on the disclosed contents herein.

It should be noted that the structures, ratios, sizes shown in the appended drawings are to be construed in conjunction with the disclosures herein in order to facilitate understanding of those skilled in the art. They are not meant, in any way, to limit the implementations of the present disclosure, and therefore contain no substantial technical meaning. Without influencing the effects created and the objectives achieved by the present disclosure, any modifications, changes or adjustments to the structures, ratios or sizes should fall within the scope encompassed by the technical contents disclosed herein. Meanwhile, terms such as "above," "first," "second," "a," "an," and the like, are for illustrative purposes, and are not meant to limit the scope in which the present disclosure can be implemented. Any variations or modifications made to their relative relationships, without substantial changes to their technical contents, are also to be construed as within the scope of the present disclosure. In addition, any ranges and values recited herein are inclusive and can be combined. Any numerical values or points, such as any integers, within a range described herein can be used as a minimum or a maximum for deriving a lower range, for example.

Embodiment 1

Figure 1:
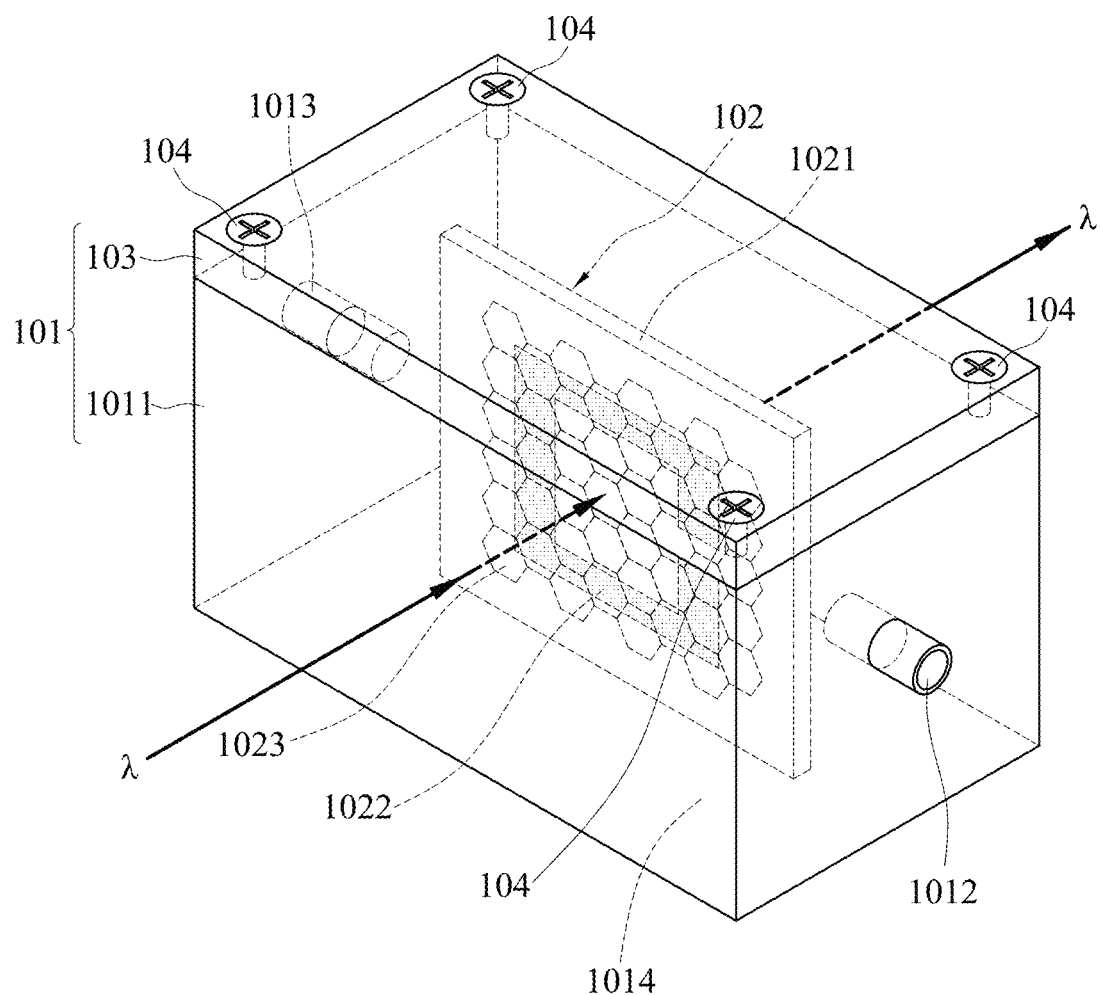
FIG. 1 is a schematic diagram depicting a specific implementation of a gas measurement device in accordance with the present disclosure.

A specific implementation of a gas measurement device 100 in accordance with the present disclosure is shown in FIG. 1. More specifically, the gas measurement device 100 of this embodiment includes a gas channel module 101 and a sensor component 102. The sensor component 102 can be disposed within the gas channel module 101, and the gas channel module 101 includes a main body 1011, an input end 1012 and an output end 1013.

The main body 1011 includes a receiving space 1014 for receiving the sensor component 102 therein. The input end 1012 is used for guiding a gas to be tested into the receiving space 1014, and the output end 1013 is used for guiding the gas to be tested out of the receiving space 1014. The material of the main body 1011 includes at least one selected from the group consisting of Teflon, polypropylene (PP), polymethyl methacrylate (PMMA), polycarbonate (PC), polyethylene terephthalate (PET), polyimide (PI), polyethylene (PE), polystyrene (PS), propylene diethylene glycol carbonate (CR39) and polytetramethylpentene (TPX).

The sensor component 102 can be disposed in the receiving space 1014, and can also be removed from the receiving space 1014. Furthermore, the sensor component 102 includes a substrate 1021, a porous membrane 1023, and a metal layer 1022 disposed between the substrate 1021 and the porous membrane 1023.

The thickness of the metal layer 1022 ranges from 0.1 to 50 $\mu$m (micrometers), for example, 0.1 to 40 $\mu$m, 0.1 to 30 $\mu$m, 0.1 to 20 $\mu$m, 0.1 to 10 $\mu$m, 0.1 to 1 $\mu$m, 1 to 50 $\mu$m, 1 to 40 $\mu$m, 1 to 30 $\mu$m, 1 to 20 $\mu$m, 1 to 10 $\mu$m, 10 to 50 $\mu$m, 10 to 40 $\mu$m, 10 to 30 $\mu$m, or 10 to 20 $\mu$m. The metal layer 1022 includes a metal pattern formed of metal line segments, and the width of the metal line segments ranges between 0.1 to 50 $\mu$m. The shape of the metal pattern of the metal layer 1022 can be a circular loop with a gap, an oval loop with a gap, an egg-shaped loop with a gap, a rectangular loop with a gap, a crisscross or a cruciform. The material of the metal layer 1022 includes at least one selected from the group consisting of iron, gold, silver, platinum, palladium, copper, aluminum, nickel, chromium, titanium, zinc and tin.

The sensor component 102 can include one layer of porous membrane 1023, or at least two layers of porous membranes 1023. The shapes of the pores of two adjacent porous membranes 1023 may be different or the same. The thickness of the porous membrane 1023 ranges from 1 to 300 $\mu$m (micrometers), such as 10 to 300 $\mu$m, 100 to 300 $\mu$m, 200 to 300 $\mu$m, 10 to 100 $\mu$m, 10 to 50 $\mu$m, 100 to 200 $\mu$m, or 100 to 150 $\mu$m.

The porous membrane 1023 is a polymer thin film with pores, and the material of the porous membrane 1023 can be at least one selected from the group consisting of Teflon, polypropylene (PP), polymethyl methacrylate (PMMA), polycarbonate (PC), polyethylene terephthalate (PET), polyimide (PI), polyethylene (PE), polystyrene (PS), propylene diethylene glycol carbonate (CR39) and polytetramethylpentene (TPX).

The widths of the pores ranges from 0.1 to 200 $\mu$m, such as 0.1 to 100 $\mu$m, 0.1 to 1 $\mu$m, 0.1 to 10 $\mu$m, 1 to 100 $\mu$m, 1 to 10 $\mu$m, 1 to 50 $\mu$m, or 10 to 50 $\mu$m, and there are a plurality of pores.

As shown in FIGS. 1 to 2 and FIGS. 3A to 3B, the shape of the pores in this embodiment is a hexagon, but the present disclosure is not limited to this. In other specific implementations, such as those shown in FIGS. 3C to 3H, the shapes of the pores can include at least one selected from the group consisting of a triangle, a rectangle, a parallelogram, and a circle.

The thickness of the substrate 1021 ranges from 10 to 1000 $\mu$m. In an embodiment, the substrate 1021 is a sapphire substrate, but the present disclosure is not limited to this. In other specific implementations, the substrate 1021 may include at least one selected from the group consisting of a silicon dioxide substrate, a gallium arsenide substrate, a gallium phosphide substrate, an indium phosphide substrate, a silicon nitride substrate, a gallium nitride substrate, an aluminum nitride substrate, a sapphire substrate, a silicon substrate, a spinel substrate, a glass substrate, a diamond substrate, a diamond-like substrate, a silicon carbide substrate, a quartz substrate, a graphene substrate and a ceramic substrate.

The substrate 1021 can be a flat sheet, and the direction in which a terahertz wave $\lambda$ travels is parallel to the normal direction of the substrate 1021. The thickness of the substrate 1021 ranges from 10 to 1000 $\mu$m. In a specific implementation of the gas measurement device 100 of the present disclosure, the substrate 1021 is a flat rectangular sheet, and the side length of the substrate 1021 ranges from 1 to 1000 $\mu$m, such as 1 to 500 $\mu$m, 1 to 400 $\mu$m, 1 to 300 $\mu$m, 1 to 200 $\mu$m, 1 to 100 $\mu$m, 1 to 10 $\mu$m, 10 to 20 $\mu$m, 10 to 30 $\mu$m, 10 to 40 $\mu$m, 10 to 50 $\mu$m, or 1 to 100 $\mu$m.

During gas measurement, a terahertz wave $\lambda$ enters from one side of the main body 1011 into the receiving space 1014, sequentially passes through the porous membrane 1023, the metal layer 1022 and the substrate 1021, and leaves the receiving space 1014 from the other side of the main body 1011. That is, during gas measurement, the gas channel module 101 allows the terahertz wave $\lambda$ to enter and pass through the porous membrane 1023, the metal layer 1022 and the substrate 1021 sequentially before exiting the gas channel module 101.

The porous membrane 1023 is capable of capturing a large amount of gas molecules to increase the chance of the terahertz wave $\lambda$ interacting with the gas molecules. The metal layer 1022 can resonant with the terahertz wave $\lambda$ to amplify the signal strength of the terahertz wave $\lambda$ after interacting with the gas molecules. The substrate 1021 can be used to carry the porous membrane 1023 and the metal layer 1022 to provide stability for the sensor component 102. As such, the present disclosure is able to increase the interaction intensities between the terahertz wave $\lambda$ and the material to be tested, while providing good measurement device portability, excellent sensitivity and superior selectivity. This means that unexpected technical effects can be obtained by the present disclosure.

In addition, referring to FIG. 1, the gas measurement device 100 further includes a cover 103 and fastening components 104, wherein the fastening components 104 are configured to secure the main body 1011 and the cover 103 together, or to detach and separate the main body 1011 and the cover 103 that were fastened together. In an embodiment, the fastening components 104 are screws or bolts, but the present disclosure is not limited to as such.

During gas measurement, under the state of the main body 1011 and the cover 103 fastening together, the input end 1012 guides the gas to be tested into the receiving space 1014 during gas measurement, while the output end 1013 guides the gas to be tested out of the receiving space 1014 during gas measurement. As a result, the gas to be tested can be prevented from leaking out of the receiving space 1014 to improve the accuracy of the measurements. The gas to be tested in the receiving space 1014 can be at least one selected from the group consisting of a polar acidic gas, a polar alkaline gas, and a volatile organic gas. The volatile organic gas may include at least one selected from the group consisting of alkanes, aldehydes, alcohols and ketones.

Outside the gas measurement period, the fastening components 104 can be unfastened from the structure in which the main body 1011 and the cover 103 are fastened together in order to separate the main body 1011 from the cover 103. As such, the installation, removal or replacement of the sensor component 102 can be conducted depending on the needs.

Embodiment 2

Figure 4A:
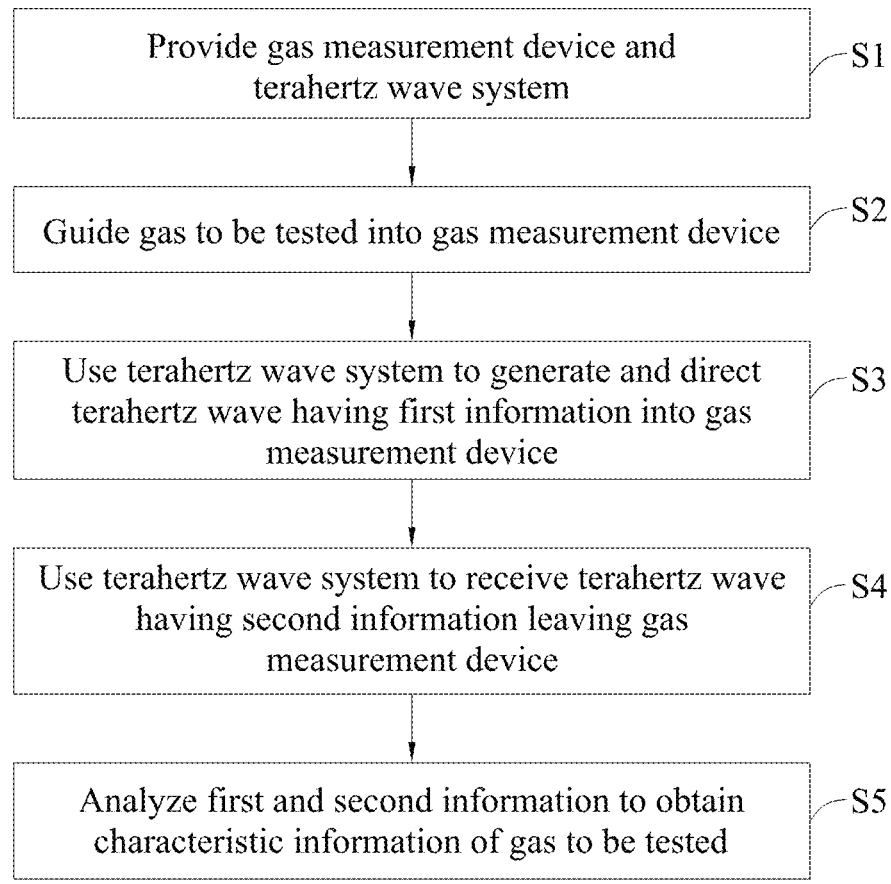
FIG. 4A is a flowchart illustrating a specific implementation of a gas measurement method in accordance with the present disclosure.

As shown in FIG. 4A, a flowchart illustrating a specific implementation of a gas measurement method in accordance with the present disclosure is shown. More specifically, the gas measurement method of the present embodiment includes: (S1) providing the gas measurement device 100 and a terahertz wave system 200 (see FIG. 4B); (S2) guiding a gas to be tested into the gas measurement device 100; (S3) using the terahertz wave system 200 to generate and direct a terahertz wave λ having first information into the gas measurement device 100 (see FIG. 1); (S4) using the terahertz wave system 200 to receive a terahertz wave λ having second information leaving the gas measurement device 100; and (S5) analyzing the first and the second information to obtain characteristic information of the gas to be tested.

Figure 2:
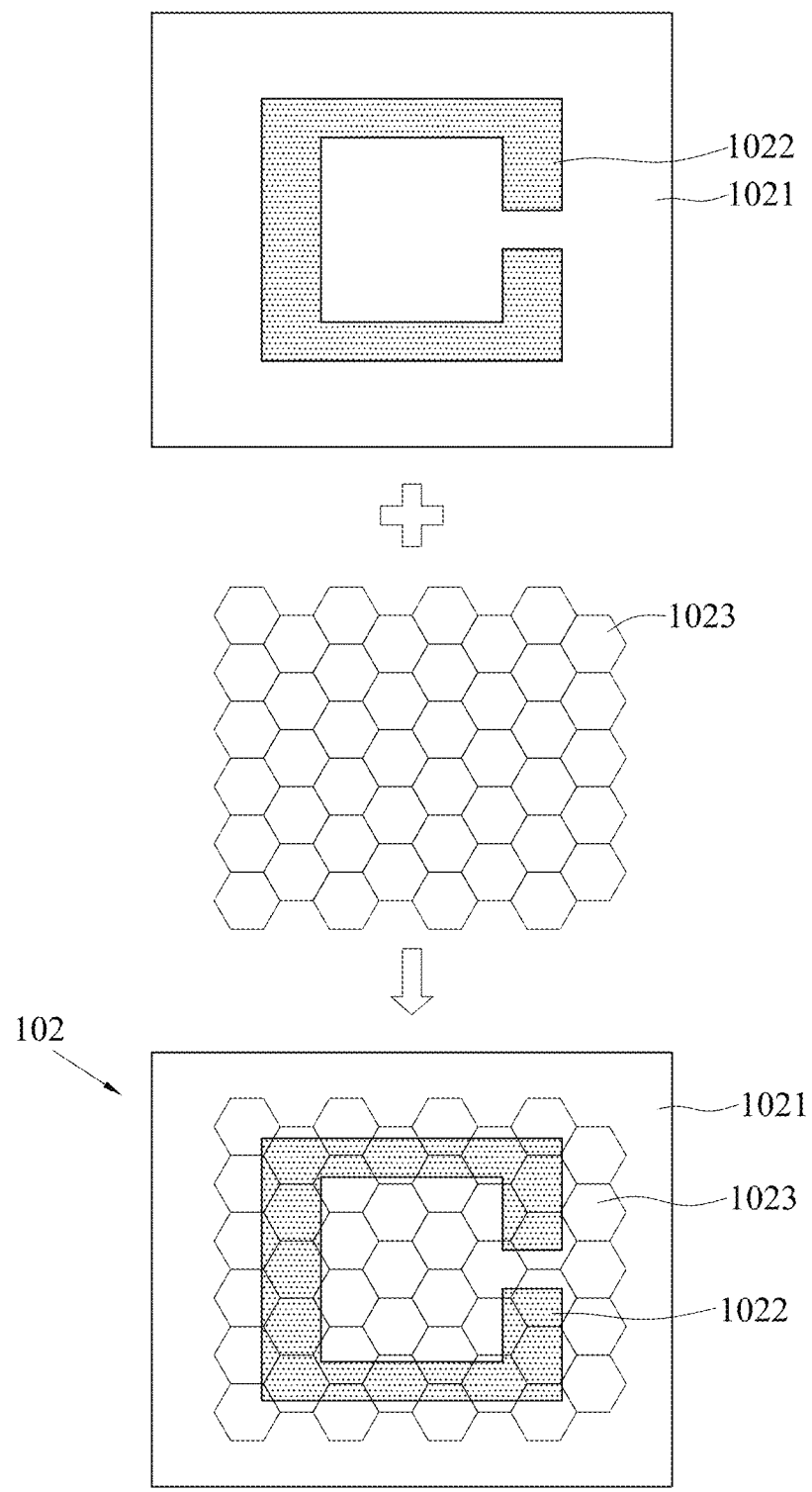
FIG. 2 is a schematic diagram depicting a specific implementation of a sensor component in accordance with the present disclosure.
Figure 3A:
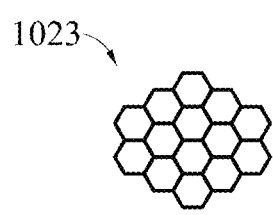
FIGS. 3A to 3H are schematic diagrams depicting specific implementations of a porous membrane in accordance with the present disclosure.
Figure 3B:
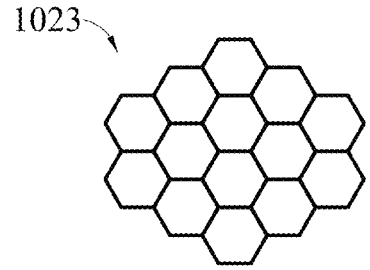
Figure 3C:
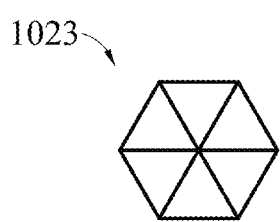
Figure 3D:
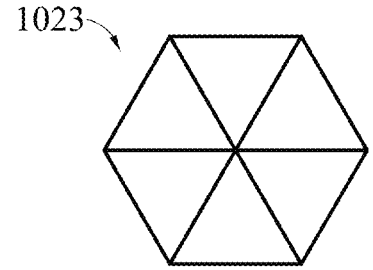
Figure 3E:
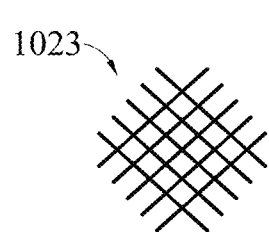
Figure 3F:
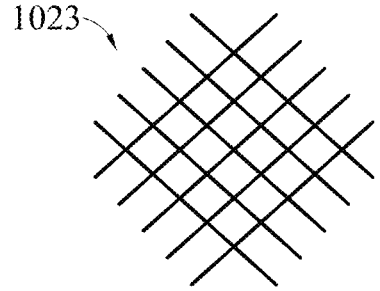
Figure 3G:
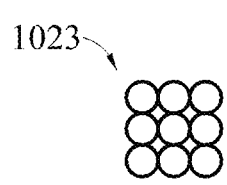
Figure 3H:
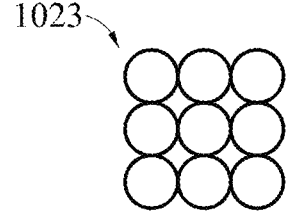

The gas measurement device employs the gas measurement device 100 described with respect to Embodiment 1 and FIGS. 1-2. More specifically, the gas measurement device 100 includes the gas channel module 101 and the sensor component 102, wherein the sensor component 102 is disposed within the gas channel module 101. The sensor component 102 includes a substrate 1021, a porous membrane 1023, and a metal layer 1022 disposed between the substrate 1021 and the porous membrane 1023.

The terahertz wave λ having the second information is formed from interactions of the terahertz wave λ having the first information with the sensor component 102 and the gas to be tested, wherein after the terahertz wave λ having the first information enter into the gas channel module 101, it passes through the porous membrane 1023, the metal layer 1022 and the substrate 1021 sequentially to form the terahertz wave λ having the second information. The frequency range of the terahertz wave λ having the first information is between 0.1 to 10 THz, and the terahertz wave λ having the first information is a single-frequency radiation or a broadband radiation.

Figure 4B:
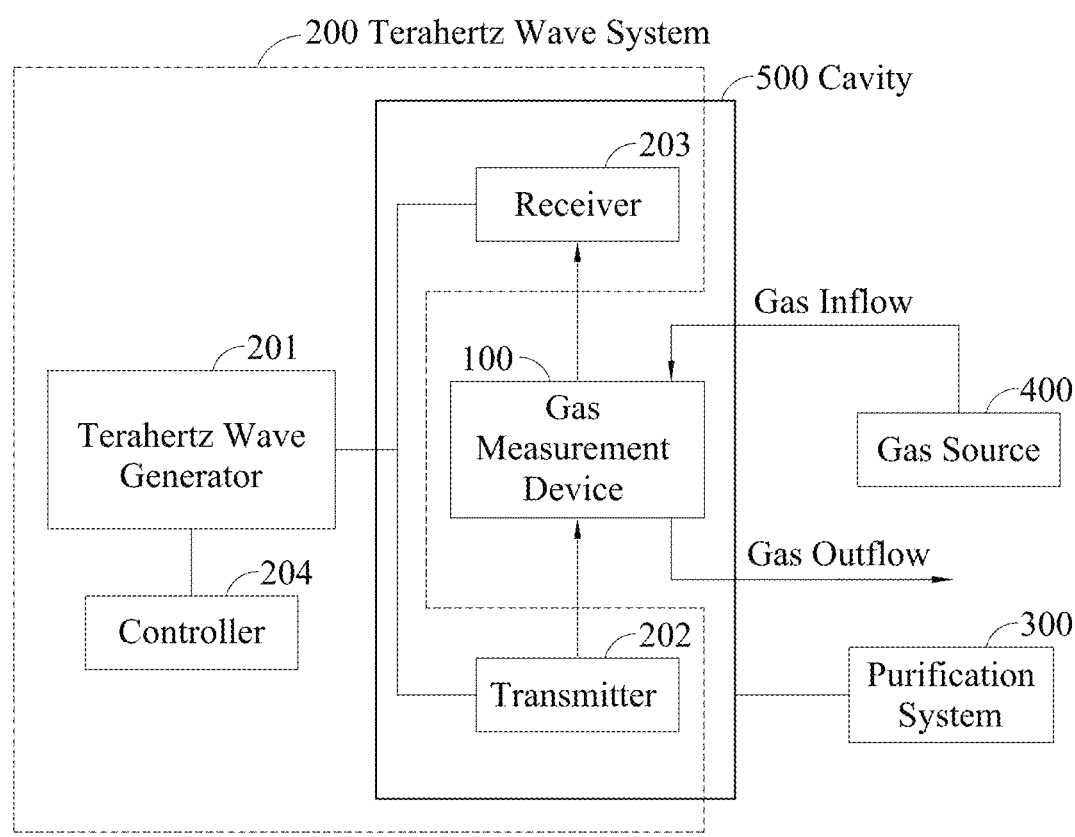
FIG. 4B is a block diagram depicting an integrated system architecture for implementing the gas measurement method of the present disclosure.

A block diagram depicting an integrated system architecture for implementing the gas measurement method of the present disclosure is shown in FIG. 4B, wherein the terahertz wave system 200 includes a terahertz wave generator 201, a transmitter 202, a receiver 203 and a controller 204, and the gas measurement device 100, the transmitter 202, the receiver 203 are disposed in a cavity 500.

The terahertz wave generator 201 is configured to generate the terahertz wave λ having the first information. The transmitter 202 is configured to guide the terahertz wave λ having the first information into the gas measurement device 100, and the receiver 203 is configured to receive the terahertz wave λ having the second information leaving the gas measurement device 100. In addition, the controller 204 is used for setting the operating conditions of the terahertz wave generator 201, the transmitter 202, and the receiver 203 to generate the terahertz wave λ having the first information depending on the needs, for example, the terahertz wave λ having the first information can be a single-frequency radiation or a broadband radiation.

Moreover, in step (S2), the cavity 500 can first be dried and moisture is removed from the cavity 500 using a purification system 300. Then, a gas to be tested can be guided from a gas source 400 to flow into the gas measurement device 100. The gas to be tested can be made to be distributed evenly in the receiving space 1014 of the gas measurement device 100. The pressure is maintained at <1 standard atmospheric pressure (atm), and the temperature is maintained at room temperature.

In addition, after gas measurement is completed, a purging gas (e.g., high purity nitrogen gas or dry air) can be passed into the gas measurement device 100 to purge any remaining gas to be tested to facilitate the next measurement.

Embodiment 3

Embodiment 3 is similar to Embodiment 2 in general, the differences between the two are explained as follows. In Embodiment 3, the chemical composition of the gas to be tested is known to be acetone. The concentration of the gas to be tested is to be measured. In addition to the gas to be tested, before steps (S1) to (S5) of Embodiment 2 are carried out for measuring the gas to be tested, two sets of samples with known concentration information are first provided. The first set of samples is 1 cc of acetone gas with a concentration of 20%, and the second set of samples is 1 cc of acetone gas with a concentration of 60%.

The integrated system architecture disclosed with respect to Embodiment 2 and FIG. 4B is provided. The terahertz wave system 200 is set by the controller 204 to generate a terahertz wave λ of single frequency radiation (see FIG. 1). First, before gas is provided to the gas measurement device 100, a terahertz wave λ is directed into the gas measurement device 100 for scanning. Then, the first set of samples and the second set of samples are separately provided into the gas measurement device 100, and the terahertz wave λ is directed into the gas measurement device 100 for scanning. Accordingly, under the conditions where no gas is provided, where the first set of samples is provided, and where the second set of samples is provided, three sets of terahertz wave information before and after the scans are obtained. Before the start of each scan, the purification system 300 is used to dry the cavity 500 and remove moisture from the cavity 500. After each scan, a purging gas (e.g., high purity nitrogen gas or dry air) is introduced into the gas measurement device 100 to purge any remaining gas to be tested.

Figure 5:
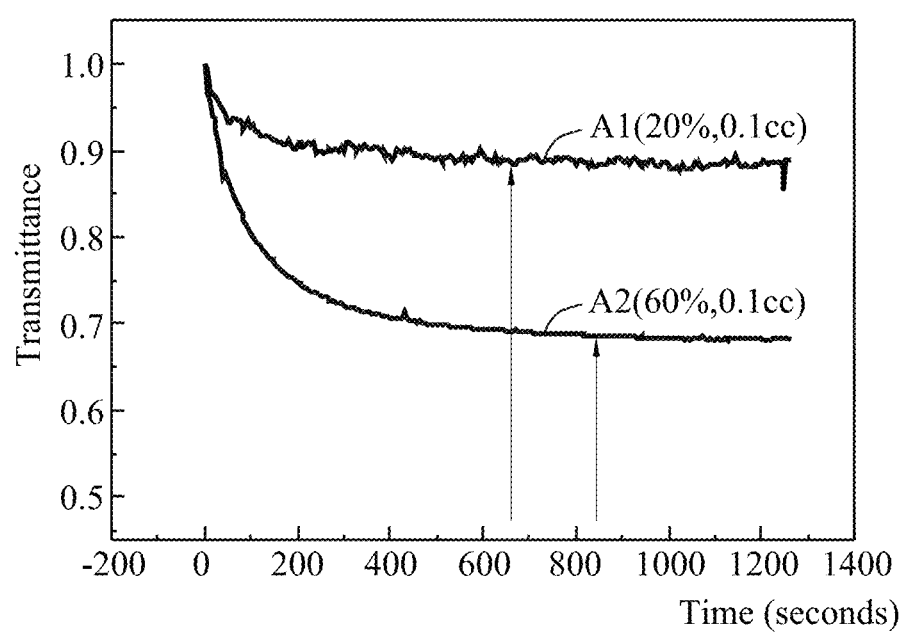
FIG. 5 is a terahertz wave single-frequency scan spectrum graph for standard samples in Embodiment 3 of the present disclosure.

Based on the three sets of terahertz wave information collected before and after the scans, a standard sample spectrum graph can be drawn. A standard sample spectrum graph of this embodiment is shown in FIG. 5, wherein A1 represents the first set of samples, A2 represents the second set of samples. In the standard sample spectrum graph, transmittance can be obtained based on the formula shown in equation (1) below.

$$\alpha_{no-gas} - \alpha_{gas} = \frac{1}{2L} \ln\left(\frac{P_{gas}}{P_{no-gas}}\right) \qquad (1)$$

In equation (1), $P_{gas}$ is the transmittance of the terahertz wave when a gas is present; $P_{no-gas}$ is the transmittance of the terahertz wave when no gas is present; $\alpha_{gas}$ is the absorption rate of the terahertz wave when a gas is present; $\alpha_{no-gas}$ is the absorption rate of the terahertz wave when no gas is present; and L is the thickness of the porous membrane.

Next, steps (S1) to (S5) of Embodiment 2 are carried out to measure a gas to be tested. In step (S5), the characteristic information of the gas to be tested obtained includes the transmittance and the absorption rate. In step (S5), based on FIG. 5 and the measured transmittance of the gas to be tested, the concentration of the gas to be tested can be deduced by interpolation.

Embodiment 4

Figure 6:
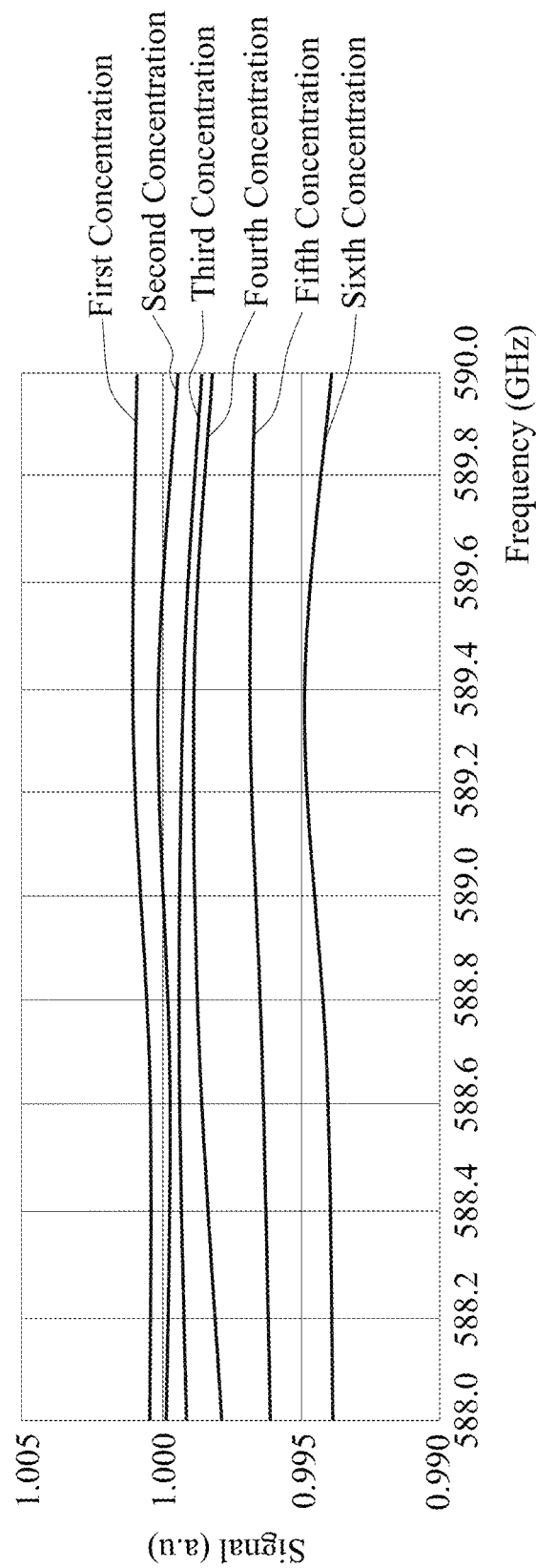
FIG. 6 is a terahertz wave single-frequency scan spectrum graph for standard samples in Embodiment 4 of the present disclosure.

Embodiment 4 is generally similar to Embodiment 3, the difference is in the process according to which the standard sample spectrum graph of Embodiment 4 is established (as shown in FIG. 6). More specifically, in Embodiment 4, the composition of the gas to be tested is known to be ethanol, and the concentration of the gas to be tested is to be measured. In other words, ethanol is used as standard samples for drawing the spectrum graph in Embodiment 4. First, six sets of standard samples with known concentration information (first to sixth concentrations) are provided, wherein the first concentration is 100 ppm; the second concentration is 200 ppm; the third concentration is 300 ppm; the fourth concentration is 400 ppm; the fifth concentration is 500 ppm; and the sixth concentration is 600 ppm. Then, the terahertz wave scanning process disclosed with respect to Embodiment 3 is implemented to scan the six sets of standard samples individually, in order to obtain terahertz wave information before and after scanning for each set of samples, and the standard sample spectrum graph for Embodiment 4 is drawn, as seen in FIG. 6.

Embodiment 5

Embodiment 5 is similar to Embodiment 2 in general, the differences between the two are explained as follows. In Embodiment 5, the composition of the gas to be tested includes at least one type of gas molecule. The composition of the gas to be tested is to be measured. In addition to the gas to be tested, before steps (S1) to (S5) of Embodiment 2 are carried out for measuring a gas, a plurality of sets of samples with known composition information are first provided.

The integrated system architecture disclosed with respect to Embodiment 2 and FIG. 4B is provided. The terahertz wave system 200 is set by the controller 204 to generate a terahertz wave λ of broadband radiation (see FIG. 1). The plurality of sets of samples are individually introduced into the gas measurement device 100 for multiple scanning to obtain a broadband scan spectrum graph for each set of the samples. Then, based on the broadband scan spectrum graphs for each set of the samples, a standard sample database can be established. Before the start of each scan, the purification system 300 is used to dry the cavity 500 and remove moisture from the cavity 500. After each scan, purging gas (e.g., high purity nitrogen gas or dry air) is introduced into the gas measurement device 100 to purge any remaining gas to be tested.

Figure 7:
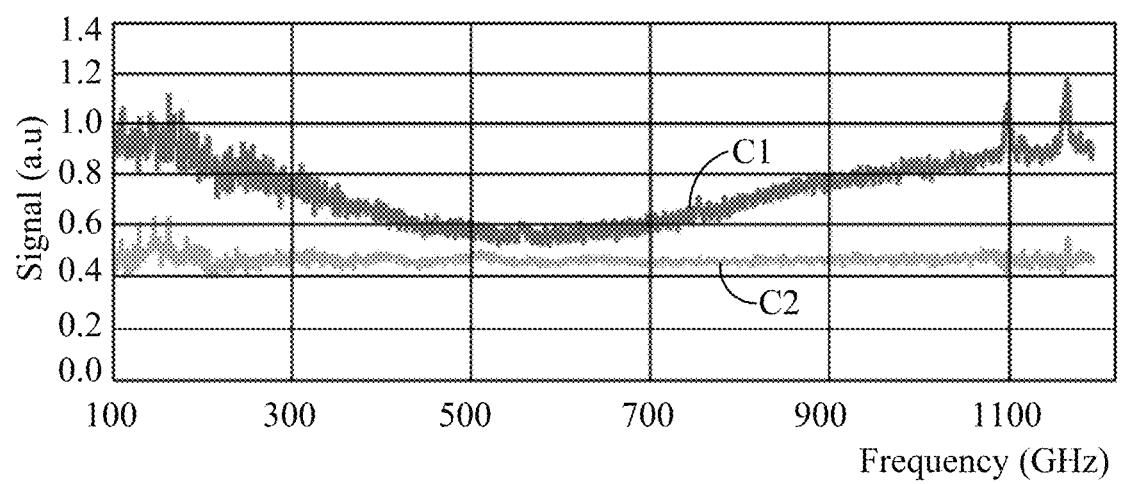
FIG. 7 is a terahertz wave single frequency scan spectrum graph for a gas to be tested in Embodiment 5 of the present disclosure.

Next, steps (S1) to (S5) of Embodiment 2 are carried out to measure a gas to be tested. In step (S5), the characteristic information of the gas to be tested obtained includes the transmittance and the absorption rate. In step (S5), based on one of the transmittance and the absorption rate of the gas to be tested, the terahertz wave broadband scan spectrum graph of the gas to be tested can be drawn, as shown in FIG. 7. Moreover, in step (S5), characteristic peak value of the terahertz wave broadband scan spectrum graph of the gas to be tested can be further identified and compared with the data in the sample database to determine the types of gas molecules included in the gas to be tested. In other words, a terahertz wave broadband scan spectrum graph can be provided based on the characteristic information of a gas to be tested, wherein the terahertz wave broadband scan spectrum graph includes at least one characteristic peak value, and the composition of the gas to be tested can be determined based on the at least one characteristic peak value.

FIG. 7 is a terahertz wave broadband scan spectrum graph of a gas to be tested in this embodiment. By comparing the sample database with the characteristic peak values, gas molecule C1 (acetone) and gas molecule C2 (ethanol) can be determined.

Embodiment 6

Embodiment 6 is generally similar to Embodiment 4, the difference is that sensitivity is calculated based on the first to sixth concentrations of the six sets of samples in Embodiment 4 and the corresponding absorption rates measured in Embodiment 4. More specifically, the slope of the curve in the graph of concentration versus absorption rate indicates the sensitivity.

Comparative Example 1

Comparative Example 1 is generally similar to Embodiment 6, the difference is that, in Comparative Example 1, six sets of samples with known concentration information (first to sixth concentrations) are scanned with the sensor component 102 removed from the gas measurement device 100. As a result, the transmittances and absorption rates of the gases to be tested are measured. Then, sensitivity can be calculated based on the first to sixth concentrations of the six sets of samples and the corresponding absorption rates measured in this Comparative Example.

Figure 8:
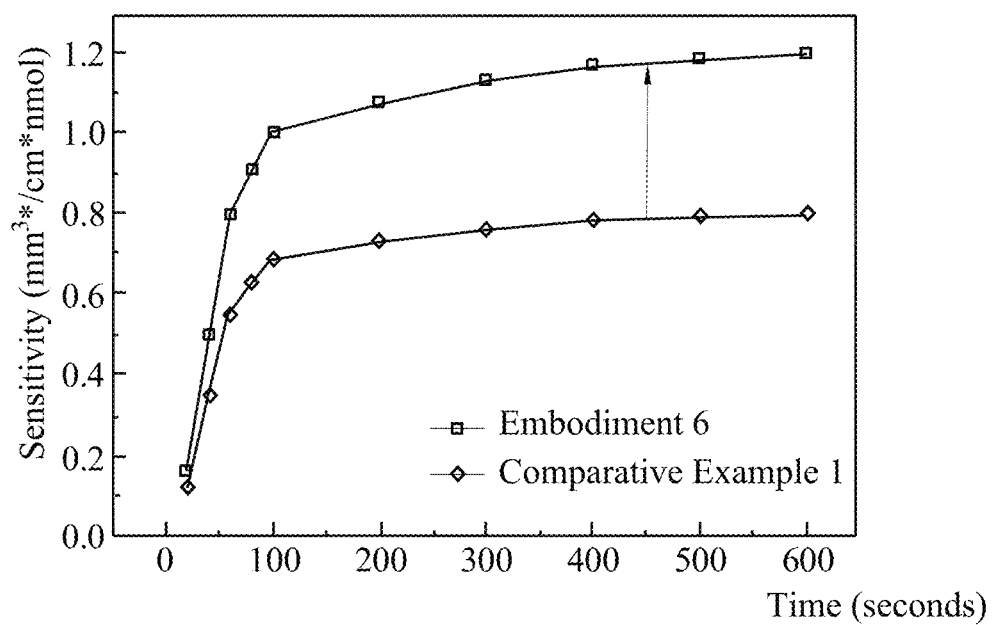
FIG. 8 is a graph comparing the sensitivities of Embodiment 6 of the present disclosure with Comparative Example 1.

FIG. 8 is a graph comparing sensitivities of Embodiment 6 and Comparative Example 1. It is apparent from this graph that the sensitivity exhibited with respect to Embodiment 6 (using a gas measurement device 100 including the sensor component 102) is significantly higher than that exhibited with respect to Comparative Example 1 (using a gas measurement device 100 without sensor component 102). In other words, using the gas measurement device 100 including the sensor component 102 can indeed create the unexpected technical effect of improving the sensitivity for gas measurement, wherein the sensor component 102 includes the substrate 1021, the porous membrane 1023, and the metal layer 1022 disposed between the substrate 1021 and the porous membrane 1023.

The above embodiments are set forth to illustrate the principles and technical effects of the present disclosure, and should not be interpreted as to limit the present disclosure in any way. The above embodiments can be modified by one of ordinary skill in the art without departing from the scope of the present disclosure as defined in the appended claims. As such, the scope of the present disclosure for which protection is sought should be defined by the appended claims.

What is claimed is:

1. A gas measurement device, comprising:
a gas channel module; and
a sensor component disposed within the gas channel module, wherein the sensor component includes a substrate, a porous membrane, and a metal layer disposed between the substrate and the porous membrane,
wherein after a first terahertz wave having a first information enters into the gas channel module, the first terahertz wave sequentially passes through the porous membrane, the metal layer and the substrate to form a second terahertz wave having a second information.

2. The gas measurement device of claim 1, wherein during gas measurement, the gas channel module allows the first terahertz wave to enter, and the first terahertz wave sequentially passes through the porous membrane, the metal layer and the substrate before exiting the gas channel module.

3. The gas measurement device of claim 1, wherein the gas channel module includes a main body, an input end and an output end, the main body includes a receiving space for receiving the sensor component therein, the input end is used for guiding a gas to be tested into the receiving space during gas measurement, and the output end is used for guiding the gas to be tested out of the receiving space during the gas measurement.

4. The gas measurement device of claim 3, wherein during the gas measurement, the first terahertz wave enters into the receiving space from one side of the main body, and sequentially passes through the porous membrane, the metal layer and the substrate before exiting the receiving space from another side of the main body.

5. The gas measurement device of claim 1, wherein the sensor component includes at least two layers of the porous membranes, and shapes of pores of the two adjacent porous membranes are same or different.

6. The gas measurement device of claim 1, wherein the substrate is a flat sheet, and a travelling direction of the first terahertz wave is parallel to a normal direction of the substrate.

7. The gas measurement device of claim 1, wherein shapes of pores of the porous membrane include at least one selected from the group consisting of a triangle, a rectangle, a hexagon, and a circle.

8. The gas measurement device of claim 1, wherein a thickness of the porous membrane ranges from 1 to 300 μm, and a width of the pores of the porous membrane ranges from 0.1 to 200 μm.

9. The gas measurement device of claim 1, wherein a material of the porous membrane is at least one selected from the group consisting of Teflon, polypropylene (PP), polymethyl methacrylate (PMMA), polycarbonate (PC), polyethylene terephthalate (PET), polyimide (PI), polyethylene (PE), polystyrene (PS), propylene diethylene glycol carbonate (CR39) and polytetramethylpentene (TPX).

10. The gas measurement device of claim 1, wherein a thickness of the metal layer ranges from 0.1 to 50 μm, and the metal layer includes a metal pattern formed of metal line segments.

11. The gas measurement device of claim 10, wherein a shape of the metal pattern of the metal layer is a circular loop with a gap, an oval loop with a gap, an egg-shaped loop with a gap, a rectangular loop with a gap, a crisscross or a cruciform.

12. The gas measurement device of claim 1, wherein a material of the main body of the gas channel module is at least one selected from the group consisting of Teflon, polypropylene (PP), polymethyl methacrylate (PMMA), polycarbonate (PC), polyethylene terephthalate (PET), polyimide (PI), polyethylene (PE), polystyrene (PS), propylene diethylene glycol carbonate (CR39) and polytetramethylpentene (TPX).

13. The gas measurement device of claim 3, wherein the gas to be tested in the gas channel module is at least one selected from the group consisting of a polar acidic gas, a polar alkaline gas, and a volatile organic gas.

14. A gas measurement method, comprising:
providing a gas measurement device and a terahertz wave system;
guiding a gas to be tested into the gas measurement device;
using the terahertz wave system to generate and direct a first terahertz wave having a first information into the gas measurement device;
using the terahertz wave system to receive a second terahertz wave having a second information leaving the gas measurement device; and
analyzing the first information and the second information to obtain a characteristic information of the gas to be tested,
wherein the gas measurement device includes a gas channel module and a sensor component disposed within the gas channel module, and the sensor component includes a substrate, a porous membrane, and a metal layer disposed between the substrate and the porous membrane,
wherein after the first terahertz wave having the first information enters into the gas channel module, the first terahertz wave sequentially passes through the porous membrane, the metal layer and the substrate to form the second terahertz wave having the second information.

15. The gas measurement method of claim 14, wherein the second terahertz wave having the second information is formed from interactions of the first terahertz wave having the first information with the sensor component and the gas to be tested.

16. The gas measurement method of claim 14, wherein a frequency range of the first terahertz wave having the first information is between 0.1 and 10 THz, and the first terahertz wave having the first information is a single-frequency radiation or a broadband radiation.

17. The gas measurement method of claim 14, wherein the gas channel module includes a main body, an input end and an output end, the main body includes a receiving space for receiving the sensor component therein, the input end is used for guiding the gas to be tested into the receiving space, and the output end is used for guiding the gas to be tested out of the receiving space.

18. The gas measurement method of claim 14, wherein the terahertz wave system includes:
- a terahertz wave generator configured to generate the first terahertz wave having the first information;
- a transmitter configured to direct the first terahertz wave having the first information into the gas measurement device; and
- a receiver configured to receive the second terahertz wave having the second information leaving the gas measurement device.

19. The gas measurement method of claim 14, further comprising providing a terahertz wave broadband scan spectrum graph based on the characteristic information of the gas to be tested, wherein the terahertz wave broadband scan spectrum graph includes at least one characteristic peak value, and a composition of the gas to be tested is determined based on the at least one characteristic peak value.

* * * * *